United States Patent
Erdmann

(10) Patent No.: US 12,310,291 B1
(45) Date of Patent: May 27, 2025

(54) ROUND BALE GROUND PLACEMENT ORIENTATION DURING BALER EJECTION

(71) Applicant: DEERE & COMPANY, Moline, IL (US)

(72) Inventor: Jeremy M. Erdmann, Floris, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/735,305

(22) Filed: Jun. 6, 2024

(51) Int. Cl.
- *A01F 15/00* (2006.01)
- *A01F 15/07* (2006.01)
- *A01F 15/08* (2006.01)

(52) U.S. Cl.
CPC ........ *A01F 15/0883* (2013.01); *A01F 15/071* (2013.01)

(58) Field of Classification Search
CPC ..... B65B 11/04; B65B 27/125; B65B 11/025; B65B 25/02; B65B 41/12; B65B 57/04; B65B 67/08; B65B 11/02; B65B 61/06; B65B 11/58; A01F 15/0715; A01F 15/071; A01F 2015/076; A01F 2015/0745; A01F 2015/074

USPC ...... 53/587, 399, 118, 389.3, 211, 588, 176, 53/556, 389.4, 430, 465, 2, 10, 461
See application file for complete search history.

(56) References Cited

U.S. PATENT DOCUMENTS

| | | | |
|---|---|---|---|
| 4,889,047 A | 12/1989 | Ardueser et al. | |
| 7,337,713 B1* | 3/2008 | Olander | B65B 27/125 100/88 |
| 2008/0264031 A1* | 10/2008 | McHale | A01F 15/0715 100/88 |
| 2022/0142053 A1* | 5/2022 | Doron | A01F 15/071 |

* cited by examiner

*Primary Examiner* — Jacob A Smith

(57) ABSTRACT

A baler implement includes a baling chamber. A wrap system wraps a wrap material around a bale within the baling chamber. A wrap sensor detects data related to a position of a tail end of the wrap material on the bale. A bale transfer device pushes the bale away during ejection from the baler implement. A baler controller determines a position of the tail end of the wrap material on the bale within the baling chamber, and initiates the ejection sequence to eject the bale onto a ground surface. The baler controller controls the bale transfer device based on the position of the tail end of the wrap material, such that the bale comes to rest with at least a minimum length of the wrap material extending between the tail end of the wrap material and a ground contact location disposed nearest the tail end of the wrap material.

14 Claims, 6 Drawing Sheets

ROUND BALE GROUND PLACEMENT ORIENTATION DURING BALER EJECTION

TECHNICAL FIELD

The disclosure generally relates to a baler implement, and more particularly to a round baler implement operable to form crop material into a bale having a cylindrical shape.

BACKGROUND

There are a wide variety of different types of machines that generate bales of material. Such baler implements can bale material like hay, straw, silage, cotton, recycled paper products, etc. One type of baler implement produces a bale having a cylindrical shape. Such a machine is often referred to as a round baler. Round baler implements form the crop material into the cylindrical shape within a baling chamber, and then wrap the bale with a wrap material while disposed in the baling chamber to secure the shape of the bale. The wrap material may include a solid material, such as but not limited to a solid plastic wrap, or a net material, often referred to as net wrap or net material.

A leading end of the wrap material is introduced into the baling chamber with the bale rotating within the baling chamber, thereby wrapping the wrap material around the exterior circumference of the bale. Once completely wrapped, often with several layers of the wrap material, the wrap system cuts the wrap material, thereby forming a tail end of the wrap material. Once the bale is completely wrapped, the baler implement ejects the completed bale from the baling chamber onto a ground surface.

If a wrapped bale rests on the ground surface for a significant period of time, plants may grow into and interweave through the openings of the wrap material. If the tail end of the wrap material is located near the ground surface, and the plant growth has interwoven with the wrap material, the tail end of the wrap material may be pulled away from the bale when the bale is moved, thereby unwinding a portion of the wrap material from the bale. This unwound portion of the wrap material is then free to drag across the ground, and potentially be caught up and wound around different components of associated work vehicles, such as tires and wheels, axles, etc., thereby requiring operating intervention to remove and/or potentially causing damage to the work vehicle. In addition, the shape of the bale may become less stable because a portion of the wrap material has been removed.

SUMMARY

A baler implement is provided. The baler implement includes a frame. A baling chamber is configured to form crop material into a bale having a cylindrical shape. A wrap system is configured to wrap a wrap material around an exterior circumference of the bale within the baling chamber to secure the shape of the bale. A wrap sensor is operable to detect data related to a position of a tail end of the wrap material on the bale. A bale transfer device is operable to direct or push the bale away from the frame. A baler controller includes a processor and a memory having a bale ejection algorithm stored thereon. The processor is operable to execute the bale ejection algorithm to determine a position of the tail end of the wrap material on the bale within the baling chamber from data detected by the wrap sensor, and initiate an ejection sequence in which the bale is ejected from the baling chamber onto a ground surface. The baler controller controls the bale transfer device during the ejection sequence, based on the position of the tail end of the wrap material, such that the bale comes to rest on the ground surface with at least a minimum length of the wrap material extending between the tail end of the wrap material and a ground contact location disposed nearest the tail end of the wrap material. The minimum length of the wrap material is greater than twenty five percent (25%) of a circumference of the bale and less than ninety percent (90%) of the circumference of the bale. In one particular implementation of the disclosure, the minimum length of the wrap material is greater than fifty percent (50%) of the circumference of the bale and less than eighty percent (80%) of the circumference of the bale.

In one aspect of the disclosure, the processor is operable to execute the bale ejection algorithm to control the bale transfer device during the ejection sequence. The bale transfer device is controlled based on the position of the tail end of the wrap material, such that the bale comes to rest on the ground surface with the tail end of the wrap material spaced at least a minimum distance above the ground surface. In one implementation of the disclosure, the minimum distance is equal to or greater than three hundred millimeters (300 mm).

In one aspect of the disclosure, the wrap sensor may be configured to detect data related to cessation of operation of the wrap system. As the wrap system ceases operation, the wrap material is cut, thereby forming the tail end of the wrap material. Accordingly, the cessation of operation of the wrap system may be used to determine the location of the tail end of the wrap material. In one implementation of the disclosure, the baler implement may further include a bale size sensor that is configured to detect data related to a diametric size of the bale within the baling chamber. In addition, the baler implement may further include a speed sensor that is configured to detect data related to a rotational speed of the bale within the baling chamber. The processor may be operable to execute the bale ejection algorithm to determine the position of the tail end of the wrap material on the bale within the baling chamber from the data related to the cessation of operation of the wrap system, the data related to the diametric size of the bale, and the data related to the rotational speed of the bale within the baling chamber.

In one aspect of the disclosure, the baler implement may include a rotating member that is selectively controllable to control rotation of the bale within the baling chamber. The processor may be operable to execute the bale ejection algorithm to control the rotating member to stop rotation of the bale within the baling chamber such that a position of the tail end of the wrap material is located at a desired location within the baling chamber prior to initiating the ejection sequence. By consistently locating the tail end of the wrap material at the desired location within the baling chamber, control of the bale transfer device may be more consistent while directing or pushing the bale onto the ground surface to achieve the desired orientation of the bale on the ground surface.

In one implementation of the disclosure, the rotating member may include, but is not limited to, an endless belt supported by a plurality of rollers. At least one of the plurality of rollers is a drive roller. The baler implement may further include a belt drive that is operable to rotate the drive roller to thereby rotate the endless belt. The belt drive may include, but is not limited to, a rotation control mechanism for controlling a rotational speed of the drive roller. In one example implementation, the rotation control mechanism may include a brake coupled to the drive roller for controlling rotational speed of the drive roller. In one implementation, the belt drive may include an adjustable tensioner for controlling a tension of the endless belt about the plurality of rollers, whereby the rotational speed of the endless belt may be controlled via the adjustable tensioner.

Accordingly, the baler implement described herein controls the bale transfer device during the ejection sequence to achieve a desired orientation of the tail end of the wrap material relative to the ground surface. Particularly, the baler implement controls the bale transfer device to achieve an orientation of the wrap material in which at least a minimum length of the wrap material extends between the tail end of the wrap material and a ground contact location disposed nearest the tail end of the wrap material, such that the tail end of the wrap material is spaced at least a minimum distance above the ground surface. By so doing, that tail end remains attached to the bale when removed from the ground surface, and any plant growth that may have grown into and interwoven with the wrap material is unable to detach the tail end of the wrap material from the bale.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

The terms "forward", "rearward", "left", and "right", when used in connection with a moveable implement and/or components thereof are usually determined with reference to the direction of travel during operation, but should not be construed as limiting. The terms "longitudinal" and "transverse" are usually determined with reference to the fore-and-aft direction of the implement relative to the direction of travel during operation, and should also not be construed as limiting.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
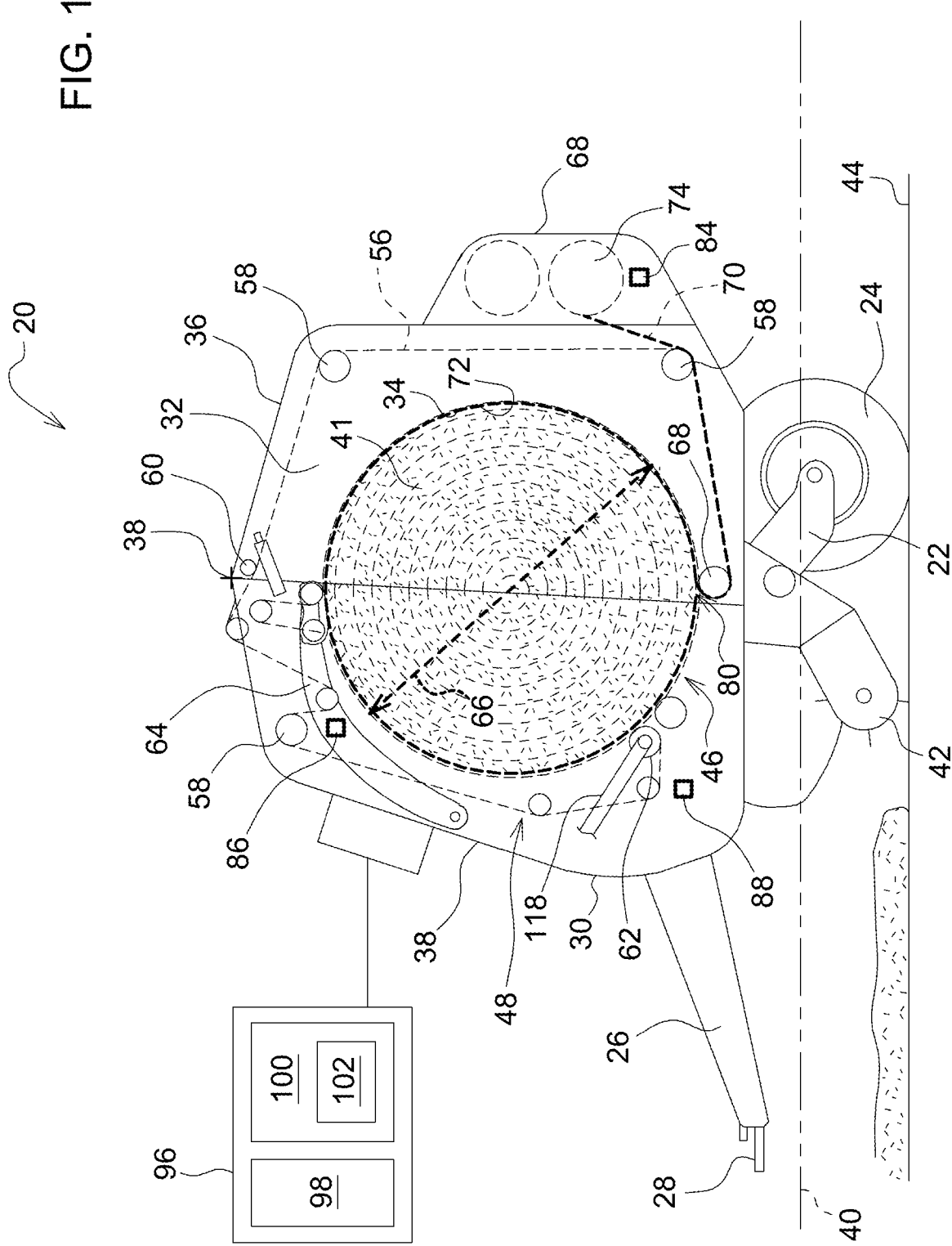
FIG. 1 is a schematic side view of a baler implement showing a bale formed within a baling chamber during a wrapping sequence.
Figure 3:
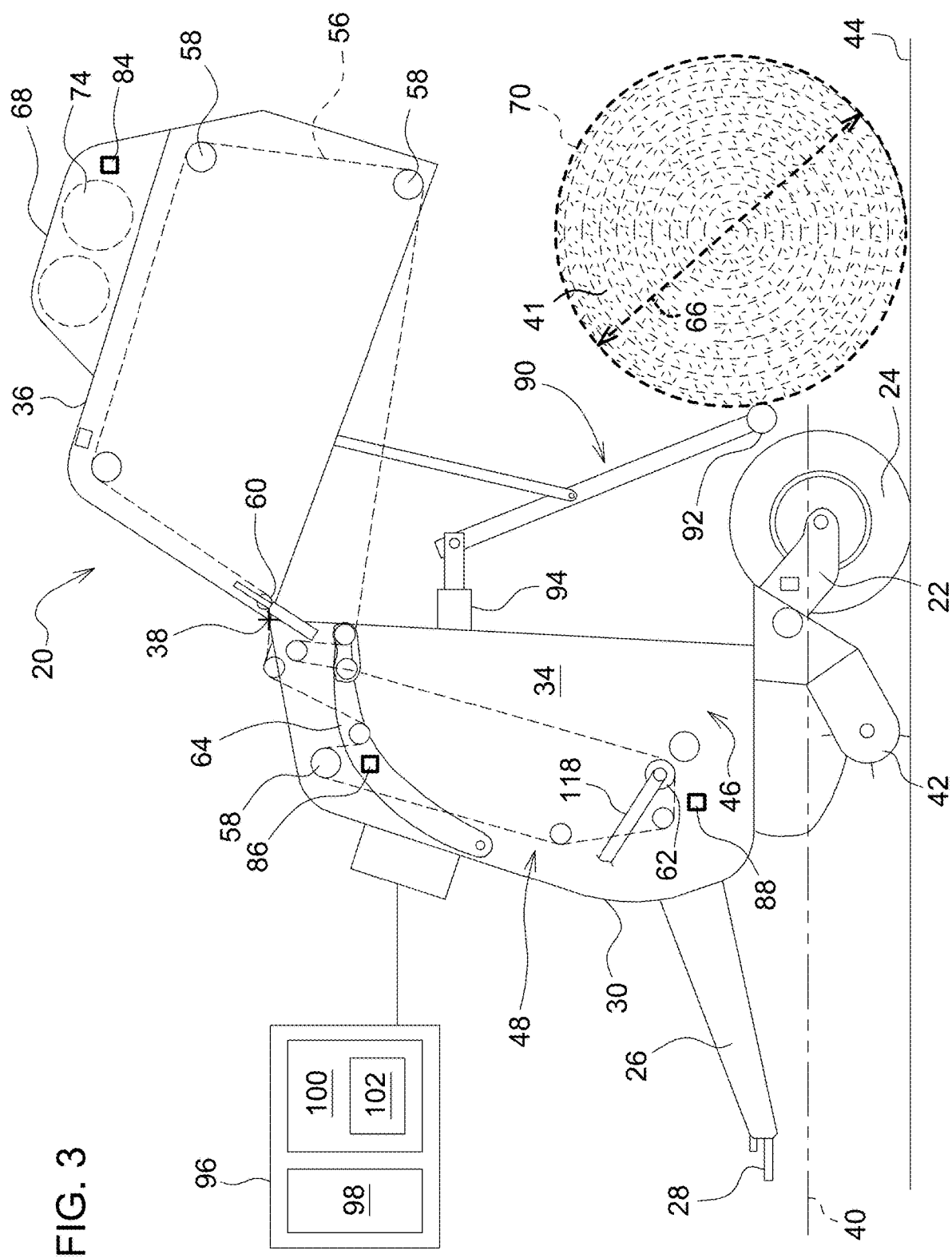
FIG. 3 is a schematic side view of the baler implement showing a bale transfer device of the baler implement pushing the bale away from the baler implement during a bale ejection sequence.

Referring to FIGS. 1 and 3, a baler implement 20 is generally shown at 20. The baler implement 20 includes a frame 22. One or more ground engaging elements 24, such as but not limited to one or more wheels and/or tracks, are attached to and rotatably supported by the frame 22. A tongue 26 may be coupled to the frame 22 at a forward end of the frame 22. A hitch arrangement 28 may be included with the tongue 26. The hitch arrangement 28 may be used to attach the baler implement 20 to a traction unit, such as but not limited to an agricultural tractor. In other embodiments, the baler implement 20 may be self-propelled, in which case the traction unit and the baler implement 20 are configured as a single, self-propelled vehicle.

The baler implement 20 includes a housing 30 forming an interior region 32. The housing 30 is attached to and supported by the frame 22. The housing 30 may include one or more walls or panels that at least partially enclose and/or define a baling chamber 34, for example, sides of the baling chamber 34. The baler implement 20 may further include a gate 36. The gate 36 is attached to and rotatably supported by the housing 30. The gate 36 is positioned adjacent a rearward end of the frame 22 and is pivotably moveable about a gate axis 38. The gate axis 38 is generally horizontal and perpendicular to a central longitudinal axis 40 of the frame 22. The gate 36 is moveable between a closed position for forming a bale 41 within the baling chamber 34, and an open position for discharging the bale 41 from the baling chamber 34.

The baler implement 20 includes a pick-up 42 disposed proximate the forward end of the frame 22. The pickup gathers crop material from a ground surface 44 and directs the gathered crop material toward and into an inlet 46 of the baling chamber 34. The pickup may include, but is not limited to tines, forks, augers, conveyors, baffles, etc., for gathering and moving the crop material. The baler implement 20 may be equipped with a pre-cutter, disposed between the pickup and the inlet 46. As such, the pre-cutter is disposed downstream of the pickup and upstream of the inlet 46 relative to a direction of travel of the crop material. The pre-cutter cuts or chops the crop material into smaller pieces.

Figure 4:
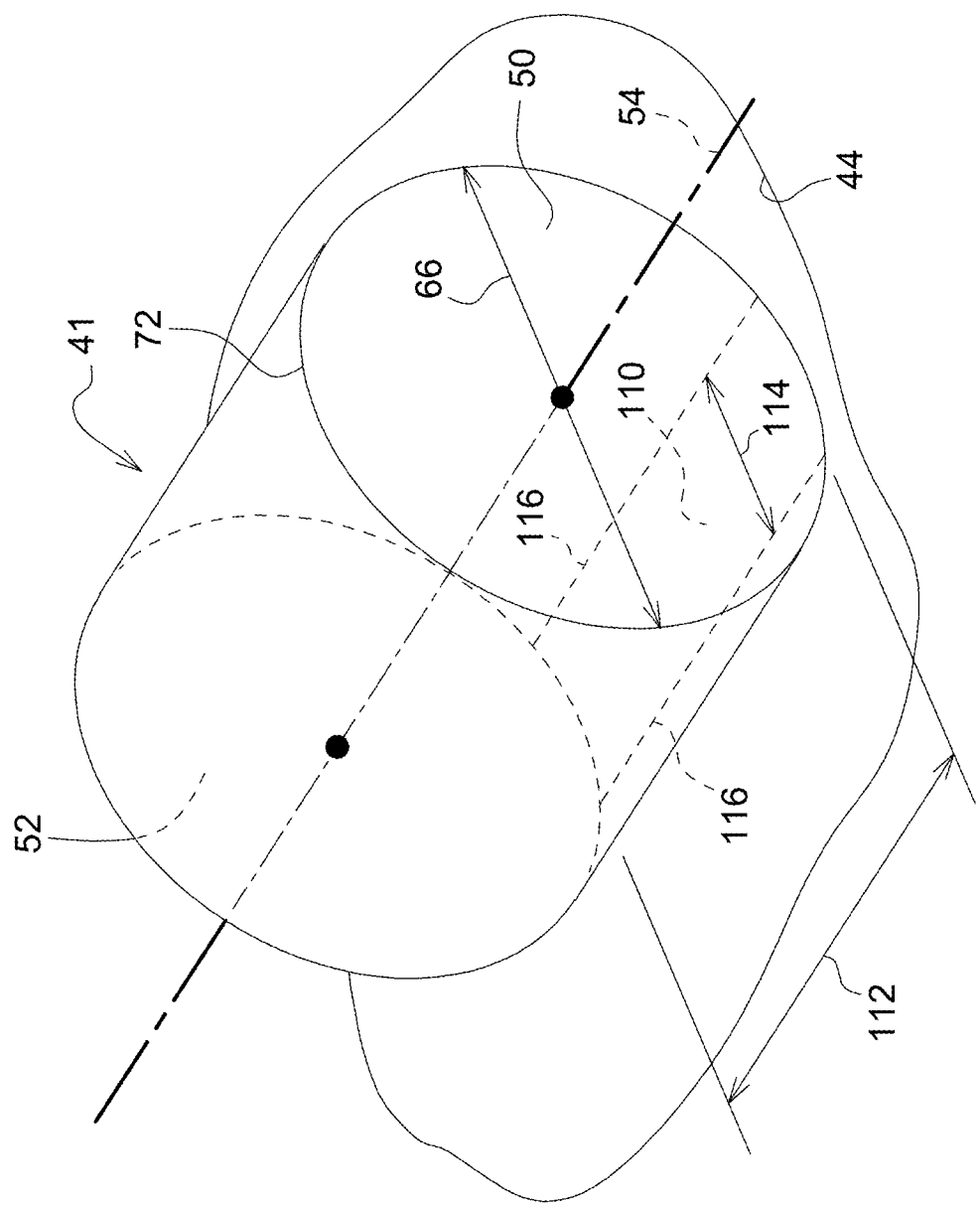
FIG. 4 is a schematic perspective view of the bale.

A bale formation system 48 is disposed within the interior region 32 and defines the baling chamber 34, within which a bale 41 is formed. The bale formation system 48 is operable to form the bale 41 to have a cylindrical shape. As such, the baler implement 20 may be referred to as a round baler. Referring to FIG. 4, the cylindrical shape of the bale 41 includes a first circular end face 50 and a second circular end face 52 disposed at opposing ends of the bale 41 relative to a centerline 54 of the cylindrical shape. The centerline 54 of the bale 41 is generally located and extends through respective diametric centers of the first circular end face 50 and the second circular end face 52. The centerline 54 of the cylindrical shape is generally parallel with the gate 36 rotation axis and perpendicular to the central longitudinal axis 40 during formation of the bale 41 by the bale formation system 48, within the baling chamber 34.

The baler implement 20 may be configured as a variable chamber baler, or as a fixed chamber baler. The baler implement 20 shown in the Figures and described herein is depicted and described as a variable chamber baler. Referring to FIGS. 1 and 3, and as is understood by those skilled in the art, the variable chamber baler includes at least one, and may include a plurality of longitudinally extending side-by-side forming belts 56 that are supported by a plurality of rollers 58. The forming belts 56 define the baling chamber 34 and move in an endless loop to form crop material into the bale 41 having the cylindrical shape. The bale 41 is formed by the forming belts 56 and one or more side walls of the housing 30 and gate 36. As is understood by those skilled in the art, the forming belts 56 are controlled to vary the diametric size of the baling chamber 34.

The plurality of rollers 58 support the forming belts 56. At least one of the rollers 58 may be a take-up roller 60. The take-up roller 60 is moveably coupled to one of the gate 36 or the housing 30, and is operable or moveable to decrease slack in the forming belts 56 when the gate 36 of the baler implement 20 is opened. Additionally, at least one of the plurality of rollers 58 may include a drive roller 62 that is operable to drive the forming belts 56 in the endless loop through frictional engagement between the forming belts 56 and the drive roller 62.

In the example implementation shown in the figures and described herein, in which the bale formation system 48 includes the variable chamber baler, the crop material is directed through the inlet 46 and into the baling chamber 34, whereby the forming belts 56 roll the crop material in a spiral fashion into the bale 41 having the cylindrical shape. The forming belts 56 apply a constant pressure to the crop material as the crop material is formed into the bale 41. A belt tensioner 64 continuously moves one or more of the rollers 58, and thereby the forming belts 56, radially outward relative to the centerline 54 of the cylindrical bale 41 as a diameter 66 of the bale 41 increases. The belt tensioner 64 maintains the appropriate tension in the belts to obtain the desired density of the crop material.

While the example implementation of this disclosure is described with the baler implement 20 embodied as a variable chamber baler, it should be appreciated that the teachings of this disclosure may applied to a fixed chamber baler. Generally, a fixed chamber baler includes a plurality of rollers 58 arranged in at fixed positions to define the baling chamber 34. One or more of the plurality of rollers 58 may be configured as a drive roller 62. Crop material is supplied into and accumulates within the baling chamber 34. When sufficient crop material is accumulated, the drive roller 62 will begin to rotate the crop material within the baling chamber 34, whereupon the diametric size of the bale 41 increases until contacting the plurality of rollers 58, which constrain the size of the bale 41. Features and operation of a fixed chamber baler are understood by those skilled in the art and are not described in greater detail herein.

Figure 2:
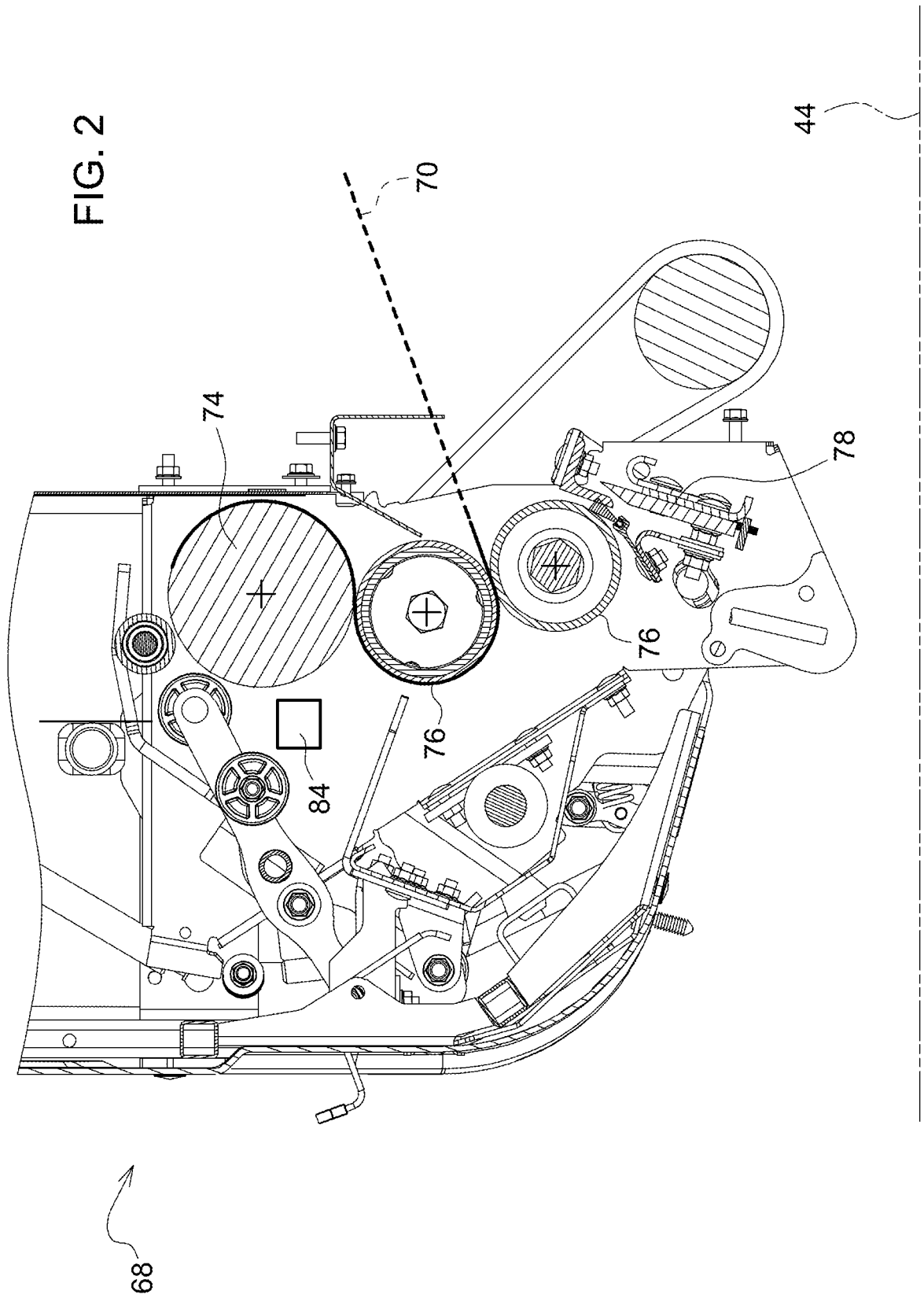
FIG. 2 is a schematic cross-sectional side view of a wrap system of the baler implement.
Figure 5:
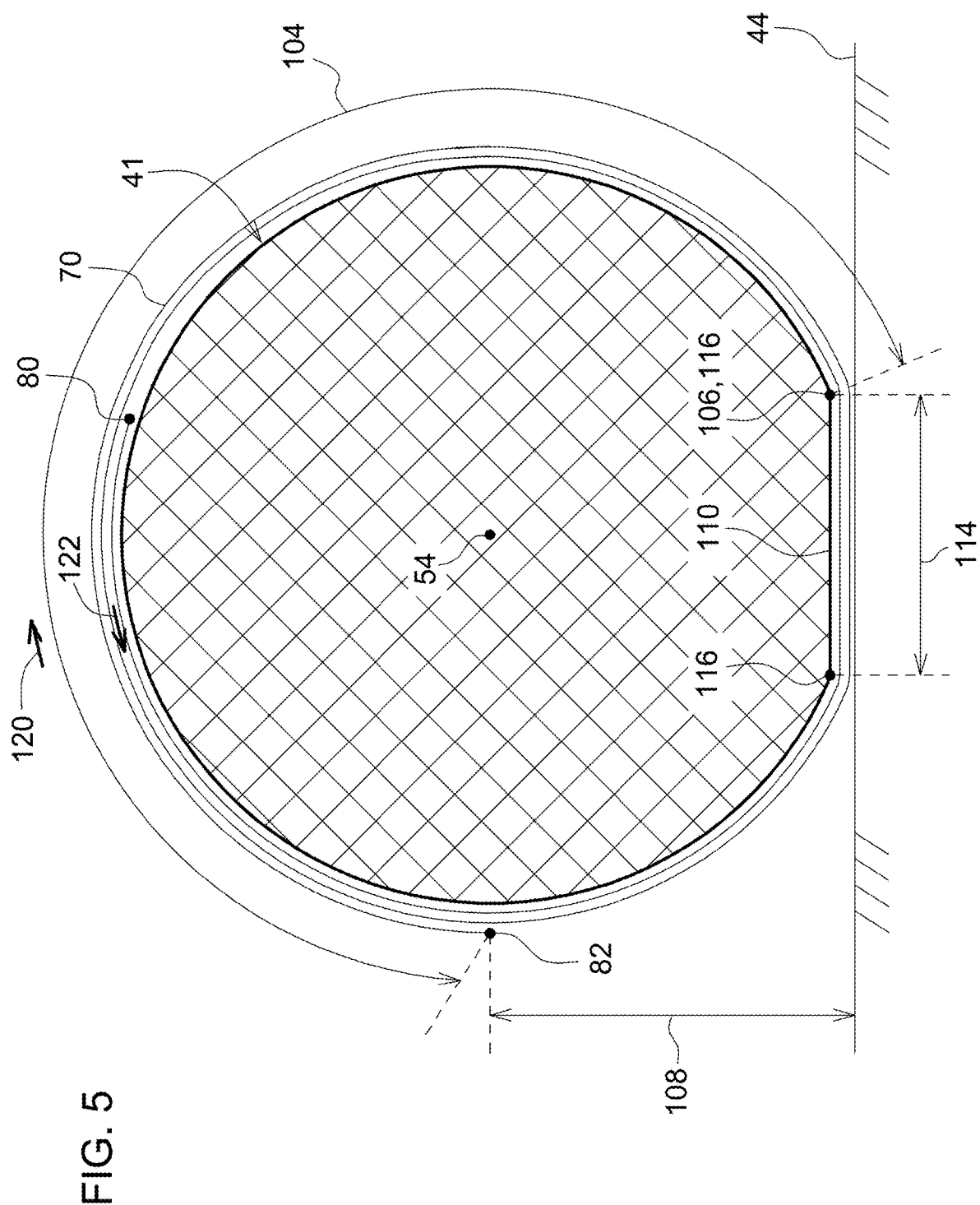
FIG. 5 is a schematic exploded cross-sectional view of the bale disposed in a resting position on a ground surface.

Referring to FIGS. 1, the baler implement 20 includes a wrap system 68. The wrap system 68 is operable to wrap the bale 41 with a wrap material 70 inside the baling chamber 34. Once the bale 41 is formed to a desired size, the wrap system 68 feeds the wrap material 70 into the baling chamber 34 to wind the wrap material 70 around an exterior circumference 72 of the bale 41 within the baling chamber 34 to secure the shape of the bale 41 in a tight package and maintain the desired shape of the bale 41. The wrap material 70 may include, but is not limited to, a twine, a mesh or net material 70, or a solid plastic material. The wrap material 70 may alternatively be referred to herein as the net material 70. Referring also to FIG. 2, the wrap system 68 may include, but is not limited to, a supply roll 74 of the net material 70 rotatably supported by the frame 22, and one or more feed rollers 76 that may be rotatably driven to feed or introduce the net material 70 into the baling chamber 34. The wrap system 68 may further include a knife 78 or other device capable of cutting the net material 70 across a width of the baler implement 20 to separate the net material 70 wrapped around the bale 41 within the baling chamber 34 from the supply roll 74 of the net material 70. When a bale 41 is fully formed, the feed roller 76 may be actuated to introduce the net material 70 into the baling chamber 34. Referring also to FIG. 5, the edge of the net material 70 introduced into the baling chamber 34 to begin the wrap sequence may be referred to as a leading edge 80 of the net material 70. Rotation of the bale 41 within the baling chamber 34 draws or pulls the leading edge 80 of the net material 70 into the baling chamber 34 and winds the net material 70 around the bale 41 as the bale 41 rotates about its centerline 54. Typically, several layers of net material 70 may be wound around the bale 41. When the bale 41 is fully wrapped, the knife 78 cuts the net material 70 to separate the net material 70 from the supply roll 74. The cut end of the net material 70 disposed on the bale 41 is referred to herein as the tail end 82 of the net material 70. It should be appreciated that the wrap system 68 may be implemented in many different configurations other than the example implementation described herein, the specific features, components, and operation of the wrap system 68 are understood by those skilled in the art, and are therefore not described in greater detail herein.

Referring to FIG. 1, the baler implement 20 further includes a wrap sensor 84. The wrap sensor 84 is operable to detect data related to a position of the tail end 82 of the net material 70 on the bale 41. In one implementation, the wrap sensor 84 is configured to detect data related to cessation of operation of the wrap system 68. As described above, upon the bale 41 being fully wrapped, the knife 78 of the wrap system 68 cuts the net material 70, thereby forming the tail end 82 of the net material 70 and stopping or ceasing operation of the wrap system 68. As such, the cessation of operation of the wrap system 68 is directly tied to the formation of the tail end 82 of the net material 70, and may be used to identify and/or locate the tail end 82 relative to the bale 41 and within the baling chamber 34. The wrap sensor 84 may include, for example, but it not limited to, a sensor coupled to a switch used to actuate the wrap system 68. The sensor may detect when the switch is engaged to actuate the wrap system 68, and detect when the switch is disengaged, thereby signaling the cessation of operation of the wrap system 68. In other implementations, the wrap sensor 84 may include, for example, a camera arranged to detect or capture an image of the tail end 82 of the net material 70 as it passes a defined location within the baling chamber 34, or some other device that is capable of detecting data that may be used to determine the location of the tail end 82 of the net material 70 within the baling chamber 34.

Referring to FIG. 1, in addition to the wrap sensor 84, or incorporated into and as part of the wrap sensor 84, the baler implement 20 may further include a bale size sensor 86. The bale size sensor 86 is configured to detect data related to a diametric size of the bale 41 within the baling chamber 34. For example, the bale size sensor 86 may include, but is not limited to, a potentiometer coupled to the belt tensioner 64 of the bale formation system 48 of the variable chamber baler. As described above, the belt tensioner 64 changes position as the diameter 66 of the bale 41 increases to maintain a consistent tension in the forming belts 56. As such, the position of the belt tensioner 64 is directly proportional to the diameter 66, i.e., the diametric size, of the bale 41. The bale size sensor 86 may be configured to sense or detect data related to the position and/or movement of the belt tensioner 64. In other implementations, the bale size sensor 86 may be implemented as a camera operable to detect images of the bale 41 within the baling chamber 34, and associated software operable Ie to analyze the images and determine the diameter 66 of the bale 41 therefrom. It should be appreciated that the bale size sensor 86 may include some other device capable of detecting data related to the diameter 66 of the bale 41 within the baling chamber 34 not mentioned or described herein.

Referring to FIG. 1, in addition to the wrap sensor 84, or incorporated into and as part of the wrap sensor 84, the baler implement 20 may further include a speed sensor 88. The speed sensor 88 is configured to detect data related to a rotational speed of the bale 41 within the baling chamber 34. For example, the speed sensor 88 may include, but is not limited to, a rotary position sensor arranged to detect rotation of the drive roller 62, an optical scanner arranged to detect a speed of the forming belts 56, or some other device that may detect and/or capture data that may be used to determine and/or calculate the rotational speed of the bale 41 within the baling chamber 34.

As described above, upon completion of the bale 41 formation process, after the bale 41 is wrapped with the net material 70, the rear gate 36 is opened and the bale 41 is ejected from the baling chamber 34. Movement of the gate 36 into the open position simultaneously moves the belts clear of the formed bale 41, and allows the formed and wrapped bale 41 to be discharged through the rear of the baling chamber 34 onto the ground surface 44.

Referring to FIG. 3, the baler implement 20 may further include a bale transfer device 90. The bale transfer device 90 is coupled to the frame 22 of the baler implement 20, and is operable to direct or push the bale 41 away from the frame 22 during the ejection sequence. The bale transfer device 90 may include a device capable of directing or controlling movement of the bale 41 relative to the baler implement 20 during ejection of the bale 41 from the baling chamber 34. For example, the bale transfer device 90 may include, but is not limited to, a ramp, a pushbar, a bale accumulator, etc. In the example implementation shown in the Figures and described herein, the bale transfer device 90 is embodied as a pushbar. As such, the example implementation of the bale transfer device 90 may include a bale engaging portion 92 and a bale transfer device actuator 94. The bale engaging portion 92 may include, but is not limited to, a bar, a roll, etc.

that contacts the bale 41 during the ejection sequence. The bale transfer device actuator 94 interconnects the bale engaging portion 92 and the frame 22. The bale transfer device actuator 94 is selectively controllable to control movement of the bale engaging portion 92 of the bale transfer device 90. The bale transfer device actuator 94 may include for example, but is not limited to, a hydraulic cylinder, an electric linear actuator, an electric rotary actuator, a hydraulic motor, or some other device capable of controlling an ejection force and/or and ejection stroke of the bale engaging portion 92. The ejection force may be defined as the force applied to the bale 41 to move the bale 41 away from the baler implement 20, and may be closely related to a speed at which the bale engaging portion 92 is moved. The ejection stroke may be defined as the distance over which the bale engaging portion 92 pushes against the bale 41 to move the bale 41. It should be appreciated that the bale transfer device 90 may include other components connecting the actuator and the bale engaging portion 92, and/or components connecting the actuator and the frame 22, not specifically mentioned and/or described herein.

Referring to FIG. 1, the baler implement 20 further includes a baler controller 96. The baler controller 96 may be disposed in communication with the wrap sensor 84, the bale size sensor 86, and the bale 41 speed sensor 88, and the bale transfer device actuator 94. While the baler controller 96 is generally described herein as a singular device, it should be appreciated that the baler controller 96 may include multiple devices linked together to share and/or communicate information therebetween. Furthermore, it should be appreciated that the baler controller 96 may be located on the baler implement 20 or located remotely from the baler implement 20.

The baler controller 96 may alternatively be referred to as a computing device, a computer, a controller, a control unit, a control module, a module, etc. The baler controller 96 includes a processor 98, a memory 100, and all software, hardware, algorithms, connections, sensors, etc., necessary to manage and control the operation of the ejection sequence. As such, a method may be embodied as a program or algorithm operable on the baler controller 96. It should be appreciated that the baler controller 96 may include any device capable of analyzing data from various sensors, comparing data, making decisions, and executing the required tasks.

As used herein, "baler controller 96" is intended to be used consistent with how the term is used by a person of skill in the art, and refers to a computing component with processing, memory 100, and communication capabilities, which is utilized to execute instructions (i.e., stored on the memory 100 or received via the communication capabilities) to control or communicate with one or more other components. In certain embodiments, the baler controller 96 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The baler controller 96 may be in communication with other components on the baler implement 20, such as hydraulic components, electrical components, and operator inputs within an operator station of an associated work vehicle. The baler controller 96 may be electrically connected to these other components by a wiring harness such that messages, commands, and electrical power may be transmitted between the baler controller 96 and the other components. Although the baler controller 96 is referenced in the singular, in alternative embodiments the configuration and functionality described herein can be split across multiple devices using techniques known to a person of ordinary skill in the art.

The baler controller 96 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 100 may include any non-transitory/tangible medium which participates in providing data or computer-readable instructions. The memory 100 may be non-volatile or volatile. Non-volatile media may include, for example, optical or magnetic disks and other persistent memory. Example volatile media may include dynamic random access memory (DRAM), which may constitute a main memory. Other examples of embodiments for memory 100 include a floppy, flexible disk, or hard disk, magnetic tape or other magnetic medium, a CD-ROM, DVD, and/or any other optical medium, as well as other possible memory devices such as flash memory.

The baler controller 96 includes the tangible, non-transitory memory 100 on which are recorded computer-executable instructions, including a bale ejection algorithm 102. The processor 98 of the baler controller 96 is configured for executing the bale ejection algorithm 102. The bale ejection algorithm 102 implements a method of ejecting the bale 41 from the baler implement 20, described in detail below.

Figure 6:
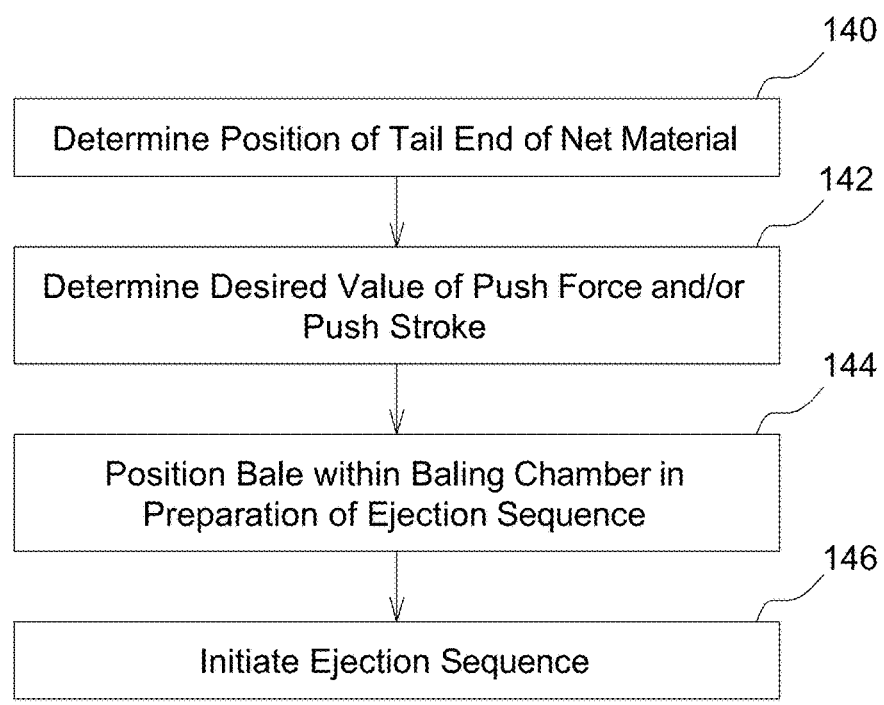
FIG. 6 is a flowchart representing a method of ejecting the bale from the baling chamber.

The baler controller 96 is configured to determine a position of the tail end 82 of the net material 70 on the bale 41 within the baling chamber 34 from data detected by the wrap sensor 84. The step of determining the position of the tail end 82 of the net material 70 is generally indicated by box 140 shown in FIG. 6. In one implementation, the baler controller 96 may determine the location of the tail end 82 of the net material 70 from the data related to the cessation of operation of the wrap system 68, the data related to the diametric size of the bale 41, and the data related to the rotational speed of the bale 41 within the baling chamber 34. By using the known location of the tail end 82 when the wrap system 68 completed, i.e., the cessation of operation of the wrap system 68, the diametric size of the bale 41, the rotational speed of the bale 41, and the duration of time since the cessation of operation of the wrap system 68, the baler controller 96 may determine the location of the tail end 82 of the net material 70 relative to the bale 41 and within the baling chamber 34.

The baler controller 96 may determine a desired value for one or both of the push force and/or the push stroke for the bale transfer device actuator 94. The step of determining the desired value of the push force and/or the push stroke is generally indicated by box 142 shown in FIG. 6. The baler controller 96 may determine and/or define the desired value of the push force and/or the push stroke to achieve a desired resting position of the bale 41 on the ground surface 44, described in greater detail below. The desired value of the push force and/or the push stroke may be based on the location of the tail end 82 of the net material 70 within the baling chamber 34, and potentially on other criteria. The other criteria that the baler controller 96 may use to determine the desired value of the push force and/or push stroke may include, but are not limited to, the inclination of the baler implement 20 relative to horizontal, the inclination of the ground surface 44 immediately rearward of the baler implement 20, the diametric size and weight of the bale 41, the type of crop material, etc.

As described above, the baler controller 96 determines and/or defines the desired value for the push force and/or the push stroke to achieve the desired resting orientation of the bale 41 on the ground surface 44, particularly, with the minimum length 104 of the net material 70 extending between the tail end 82 of the net material 70 and the ground contact location 106 disposed nearest the tail end 82 of the net material 70, and potentially with the tail end 82 of the net material 70 disposed at least the minimum distance 108 above the ground surface 44. It should be appreciated that the push force and/or the push stroke required to achieve the desired resting position of the bale 41 on the ground surface 44 changes based on the position of the tail end 82 of the net material 70 when the ejection sequence is initiated.

In order to more accurately determine and/or define the desired push force and/or the push stroke, the baler controller 96 may control a rotating member to stop rotation of the bale 41 within the baling chamber 34 such that a position of the tail end 82 of the net material 70 is located at a desired location within the baling chamber 34 prior to initiating the ejection sequence. The step of positioning the bale 41 within the baling chamber 34 in preparation for the ejection sequence is generally indicated by box 144 shown in FIG. 6. The baler controller 96 may determine the location of the tail end 82 of the net wrap within the baling chamber 34 as described above, and control the rotating member to stop rotation of the bale 41 at the desired location within the baling chamber 34.

The rotating member may include a component of the baler implement 20 that is selectively controllable to control rotation of the bale 41 within the baling chamber 34. For example, the rotating member may include, but is not limited to, the forming belts 56, the drive roller 62, the take-up roller 60, or some other component that controls and/or effects rotation of the forming belts 56 or the drive roller 62. For example, the baler implement 20 may include a belt drive 118 or other drive system used to drive and/or rotate the drive roller 62. In one implementation, the belt drive 118 may include a rotation control mechanism for controlling the rotational speed of the drive roller 62. The rotation control mechanism may include a clutch, a brake, a transmission, etc. In another implementation, the belt drive 118 may include an adjustable tensioner, e.g., the belt tensioner 64 and/or the take-up roller 60 for controlling a tension of the endless belt about the plurality of rollers 58, whereby the rotational speed of the endless belt may be controlled via the adjustable tensioner.

Once the baler controller 96 has determined the location of the tail end 82 of the net material 70 within the baling chamber 34, and determined the desired value for the push force and/or push stroke, the baler controller 96 may then initiate the ejection sequence in which the bale 41 is ejected from the baling chamber 34 onto the ground surface 44. The step of initiating the ejection sequence is generally indicated by box 146 shown in FIG. 6. During the ejection sequence, the rear gate 36 is opened and the push bar engages the bale 41 to push the bale 41 away from the baler implement 20. The baler controller 96 may control the bale transfer device 90 to exhibit the desired value of the push force and/or the push stroke during the ejection sequence to achieve the desired resting position of the bale 41 on the ground surface 44. More specifically, the baler controller 96 controls the bale transfer device 90 such that the bale 41 comes to rest on the ground surface 44 with at least a minimum length 104 of the net material 70 extending between the tail end 82 of the wrap material 70 and a ground contact location 106 disposed nearest the tail end 82 of the wrap material 70. Additionally, the baler controller 96 may control the bale transfer device 90 during the ejection sequence, such that the bale 41 comes to rest on the ground surface 44 with the tail end 82 of the net material 70 spaced at least a minimum distance 108 above the ground surface 44. In one implementation, the minimum distance 108 may be equal to or greater than three hundred millimeters (300 mm).

The ground contact location 106 may be considered the location on the exterior circumference 72 of the bale 41 at which the net material 70 contacts the ground surface 44. As is understood by those skilled in the art, the generally cylindrical shape of the bale 41 deforms slightly under the weight of the bale 41, generally forming a rectangular contact region 110 extending across a width 112 of the bale 41 and along a length 114 of the exterior surface of the bale 41. The ground contact location 106 is defined as the one of the transverse edges 116 of the rectangular contact region 110 extending transversely across the width 112 of the bale 41 that is nearest the tail end 82 of the net material 70 in the circumferential direction 120 in which the net material 70 is un-wound around the bale 41. As such, the minimum length 104 of the net material 70 is measured along a length of the net material 70 beginning at the tail end 82 of the net material 70 and extending in the direction 120 in which the net material 70 is un-wound or un-wrapped around the bale 41 until the net material 70 contacts the ground surface 44 at the nearest transverse edge 116 of the rectangular contact region 110. For reference, the circumferential direction in which the net material 70 was wound around the bale 41 is generally indicated by direction arrow 122 in FIG. 5. In one implementation, the minimum length 104 of the net material 70 is greater than twenty five percent (25%) of a circumference of the bale 41 and less than ninety percent (90%) of the circumference of the bale 41. More particularly, the minimum length 104 of the net material 70 may be greater than fifty percent (50%) of the circumference of the bale 41 and less than eighty percent (80%) of the circumference of the bale 41.

By controlling the bale 41 to come to rest on the ground surface 44 in the desired orientation, with the tail end 82 of the net material 70 spaced from the ground contact location 106 the desired minimum length 104, and spaced above the ground surface 44 at least minimum distance 108, plant growth is less likely to interwind with the net material 70 to a degree that would cause the tail end 82 of the net material 70 to be pulled away from the bale 41 when the bale 41 is moved.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A baler implement comprising:
   a frame;
   a baling chamber configured to form crop material into a bale having a cylindrical shape;
   a wrap system configured to wrap a wrap material around an exterior circumference of the bale within the baling chamber to secure the shape of the bale;
   a wrap sensor operable to detect data related to a position of a tail end of the wrap material on the bale;
   a bale transfer device operable to direct the bale away from the frame;
   a baler controller including a processor and a memory having a bale ejection algorithm stored thereon, wherein the processor is operable to execute the bale ejection algorithm to:
      determine a position of the tail end of the wrap material on the bale within the baling chamber from data detected by the wrap sensor;
      initiate an ejection sequence in which the bale is ejected from the baling chamber onto a ground surface;
      control the bale transfer device during the ejection sequence, based on the position of the tail end of the wrap material, such that the bale comes to rest on the ground surface with at least a minimum length of the wrap material extending between the tail end of the wrap material and a ground contact location disposed nearest the tail end of the wrap material, wherein the minimum length of the wrap material is greater than twenty five percent (25%) of a circumference of the bale and less than ninety percent (90%) of the circumference of the bale.

2. The baler implement set forth in claim 1, wherein the minimum length of the wrap material is greater than fifty percent (50%) of the circumference of the bale and less than eighty percent (80%) of the circumference of the bale.

3. The baler implement set forth in claim 1, wherein the processor is operable to execute the bale ejection algorithm to control the bale transfer device during the ejection sequence, based on the position of the tail end of the wrap material, such that the bale comes to rest on the ground surface with the tail end of the wrap material spaced at least a minimum distance above the ground surface.

4. The baler implement set forth in claim 3, wherein the minimum distance is equal to or greater than three hundred millimeters (300 mm).

5. The baler implement set forth in claim 1, wherein the wrap sensor is configured to detect data related to cessation of operation of the wrap system.

6. The baler implement set forth in claim 5, further comprising a bale size sensor configured to detect data related to a diametric size of the bale within the baling chamber.

7. The baler implement set forth in claim 6, further comprising a speed sensor configured to detect data related to a rotational speed of the bale within the baling chamber.

8. The baler implement set forth in claim 7, wherein the processor is operable to execute the bale ejection algorithm to determine the position of the tail end of the wrap material on the bale within the baling chamber from the data related to the cessation of operation of the wrap system, the data related to the diametric size of the bale, and the data related to the rotational speed of the bale within the baling chamber.

9. The baler implement set forth in claim 1, further comprising a rotating member selectively controllable to control rotation of the bale within the baling chamber.

10. The baler implement set forth in claim 9, wherein the processor is operable to execute the bale ejection algorithm to control the rotating member to stop rotation of the bale within the baling chamber such that a position of the tail end of the wrap material is located at a desired location within the baling chamber prior to initiating the ejection sequence.

11. The baler implement set forth in claim 9, wherein the rotating member includes an endless belt supported by a plurality of rollers.

12. The baler implement set forth in claim 11, wherein at least one of the plurality of rollers is a drive roller, and further comprising a belt drive operable to rotate the drive roller to thereby rotate the endless belt.

13. The baler implement set forth in claim 12, wherein the belt drive includes a rotation control mechanism for controlling a rotational speed of the drive roller.

14. The baler implement set forth in claim 12, wherein the belt drive includes an adjustable tensioner for controlling a tension of the endless belt about the plurality of rollers, wherein the rotational speed of the endless belt may be controlled via the adjustable tensioner.

\* \* \* \* \*